Jan. 2, 1968

T. E. TYLER 3,361,221

TRACK LAYING ATTACHMENT FOR VEHICLE

Filed Oct. 20, 1965

INVENTOR
TERRY E. TYLER

BY *Sughrue, Rothwell, Mion, Zinn & Macpeak*

ATTORNEYS

Jan. 2, 1968  T. E. TYLER  3,361,221
TRACK LAYING ATTACHMENT FOR VEHICLE
Filed Oct. 20, 1965  3 Sheets-Sheet 3

INVENTOR
TERRY E. TYLER

BY *Sughrue, Rothwell, Mion, Zinn, & Macpeak*

ATTORNEYS.

ic onnected  to United States Patent Office 3,361,221
Patented Jan. 2, 1968

3,361,221
TRACK LAYING ATTACHMENT FOR VEHICLE
Terry E. Tyler, West Dummerston, Vt., assignor to
Tyler-Cat, Inc.
Filed Oct. 20, 1965, Ser. No. 498,543
8 Claims. (Cl. 180—9.5)

ABSTRACT OF THE DISCLOSURE

An attachment for converting an ordinary pneumatic tire vehicle to a track laying vehicle.

This invention relates to improvements in track laying attachments for general purpose utility vehicles, and in particular to an improved construction of such an attachment which is simple, economical, composed of readily available components, and most important is quickly and readily detachable to enable the vehicle to be converted to a track laying vehicle or back to a rubber tired vehicle.

Track laying vehicles have many and varied uses where rubber tired vehicles are inappropriate. For example, track laying vehicles are widely used on snow, sand, swamps and the like. The vehicles are used for various purposes depending on the terrain, for example on snow a track laying vehicle may be used to pull a load or may be used for packing down snow for a ski slope.

In many places a track laying vehicle is needed only intermittently or seasonally. To buy a single vehicle for such seasonal use is extremely costly. Many times track laying vehicles are not readily available for rent, or the location is not accessible to rental facilities. Thus, the ideal solution is to provide a track laying attachment for a general purpose utility vehicle, such as a Jeep, so that the vehicle can be converted from a wheeled vehicle to a track laying vehicle and vice versa.

Although track laying attachments for general purpose utility vehicles are generally known, they have not been outstandingly successful, probably due to the difficulty in converting to the track laying attachment and then back to the rubber tired wheels, combined with the cost and complexity of the attachments. This invention provides a unique track laying attachment for a general purpose utility vehicle which may be readily attached to a vehicle in a very short time by ordinary mechanics and which correspondingly can be detached to enable the vehicle to be converted back to a wheeled vehicle. The track laying attachment is quite simple and easily constructed from readily available components. For example, it utilizes ordinary pneumatic rubber tired wheels for the drive of the track.

A further unique feature of the track laying vehicle of this invention is the provision of movably mounted side frames for each endless track. With these movably mounted side frames the track laying vehicle can go up fairly steep inclines as are required in ski slope work and can go over fairly large bumps.

Other objects of the invention will be pointed out in the following description and claims and illustrated in the accompanying drawings, which disclose by way of example, the principle of the invention and the best mode which has been contemplated of applying that principle.

Figure 1:
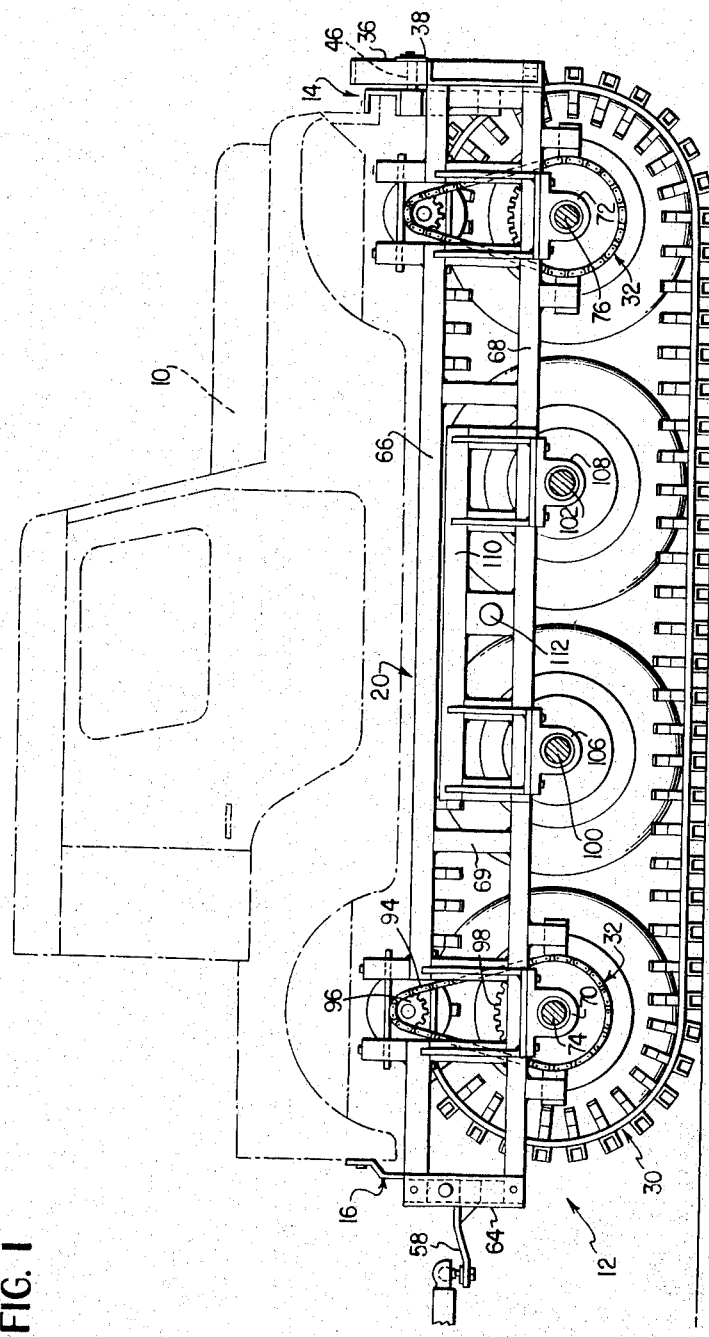
FIG. 1 is a side elevation view of the track laying attachment of this invention with certain portions removed for the sake of clarity.

A general purpose vehicle 10 to which the track laying attachment 12 of this invention is applied, is shown in FIG. 1 in phantom lines. The vehicle 10 forms no part of this invention and any suitable commercial general purpose utility vehicle such as a four wheel drive Jeep can be used. The purpose of this invention is to convert such a general purpose vehicle from its normal use with rubber tired wheels on roadways to a track laying vehicle by simple and easily applied track laying attachment 12 which can also quickly be removed so that the vehicle can be converted back again to a rubber tired road vehicle.

Figure 2:
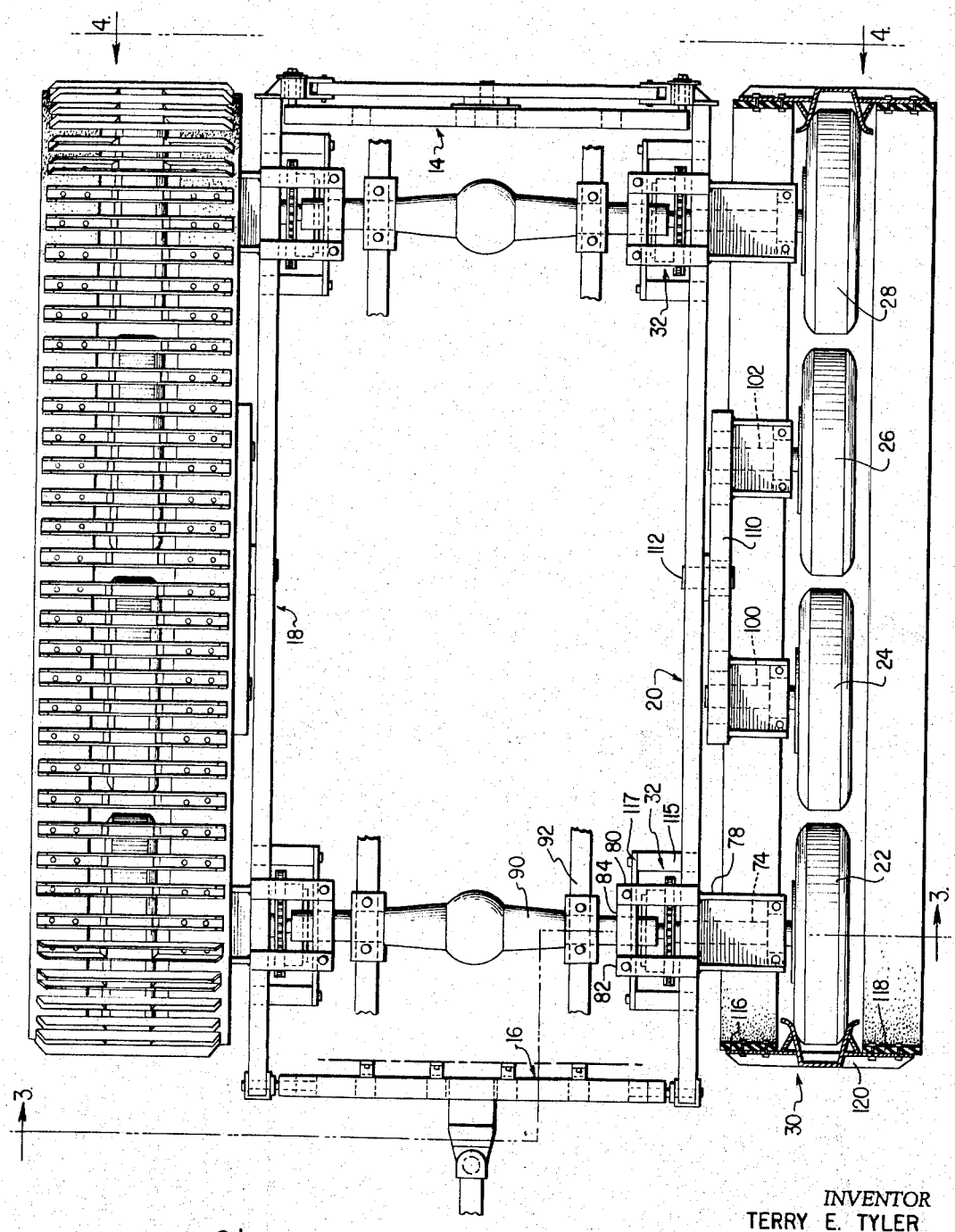
FIG. 2 is a top plan view of the track laying attachment with certain portions shown in section and certain components removed for clarity.

The track laying attachment 12 includes in general, a front frame 14, rigidly attached to the front of vehicle 10, and a rear frame 16, rigidly attached to the rear of the vehicle. There are a pair of side frames 18 and 20 movably mounted on the front and rear frames 14 and 16 at each end thereof as shown in FIG. 2. Since the side frames 18 and 20 are identical, only one need be described in detail.

A plurality of rubber tired wheels, such as wheels 22, 24, 26 and 28 are rotatably journaled from the side frames 18 and 20, and an endless track 30 is trained around the periphery of the wheels as can be seen in the drawings. There is also a drive connection 32 to at least some of the rubber tired wheels for driving the rubber tired wheels and consequently the endless track 30 from the power train and drive axles of the vehicles 10.

Figure 4:
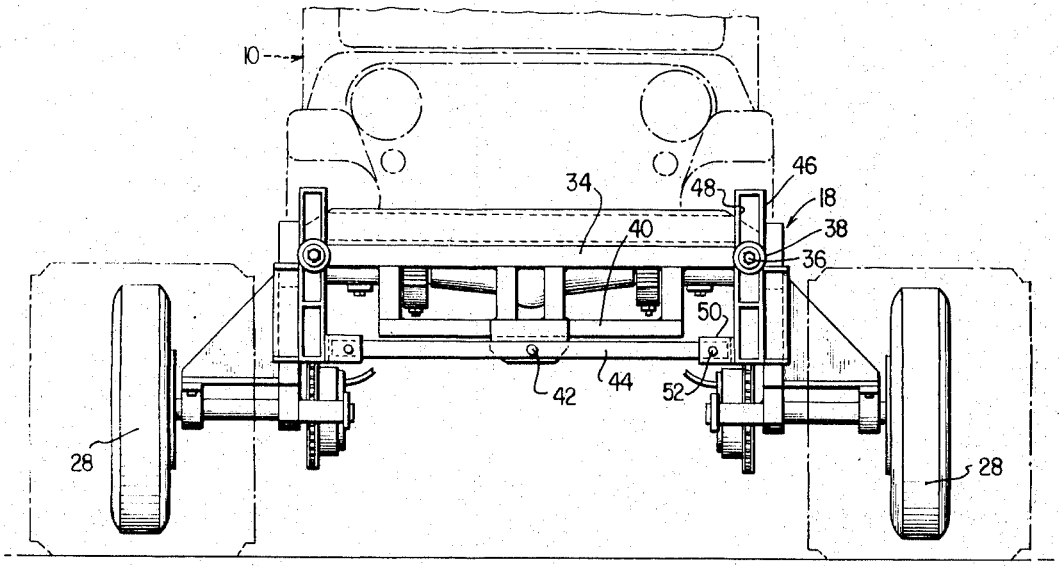
FIG. 4 is a front end elevation view looking at the attachment along line 4—4 of FIG. 2.

As shown best in FIG. 4, the front frame 14 includes a cross bar 34 attached to the front of the vehicle and mounting a projecting headed pin 36 at each end thereof. A washer 38 is positioned on the shank of the pin below its head. Depending from the cross bar 34 is a frame extension 40 mounting a pivot pin 42 for pivotally supporting an equalizing bar 44.

Each side frame rigidly mounts at the front end thereof a guide box 46 having a slot 48 therethrough for the pin 36 to move up and down in. The washer 38 abuts on the sides of the box 46. Thus the front end of each side frame may rise up and down as the vehicle goes over rough terrain. On upward movement the side frame of box 46 goes up relative to the headed pin 36 and vice versa.

The front end of each side frame such as frame 18 mounts a stub extension 50 extending inwardly and carrying a pivot 52 for the end of equalizing bar 44. Bar 44 functions as a weight equalizing bar to equalize the weight distribution as the vehicle moves over uneven terrain and one side frame or the other tends to rise.

Figure 3:
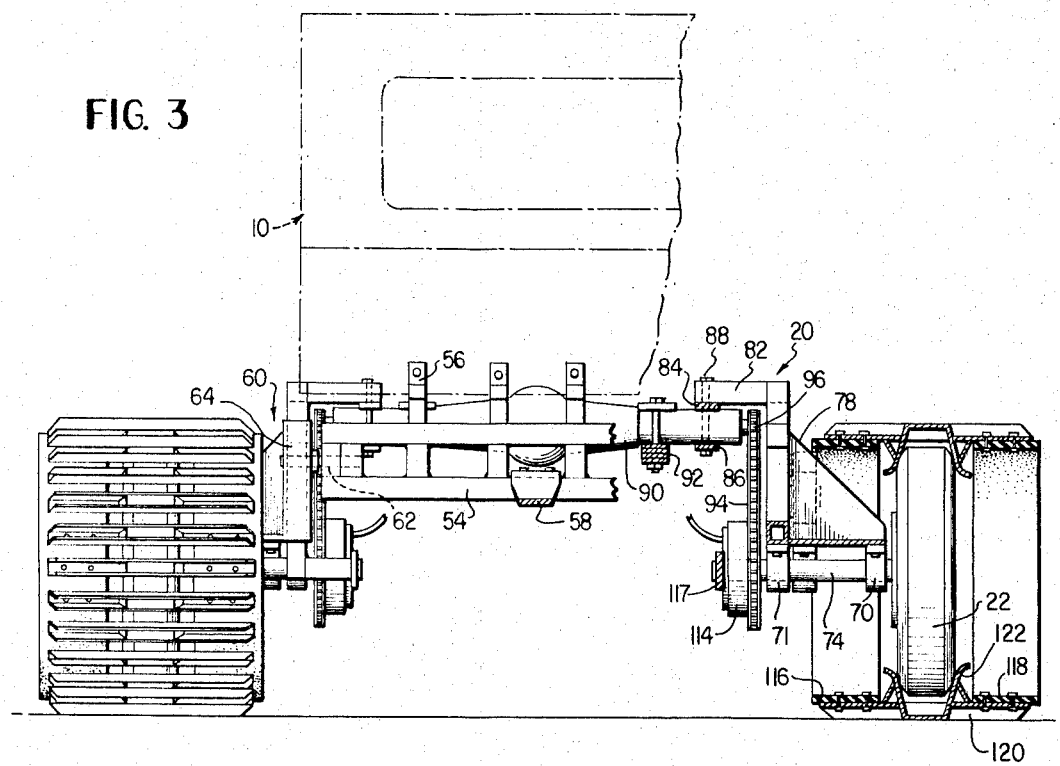
FIG. 3 is a sectional elevation view taken along line 3—3 of FIG. 2.

The rear end construction is best seen in the left-hand portion of FIG. 3. The rear frame 16 includes a cross bar girder 54 with straps 56 or other suitable means for securing the same to the vehicle. On each end of the girder 54 there is a stub X arrangement 60 including a pivotal connection 62 between the girder and an upright rear frame member 64, rigid with the side frame. Thus, these pivotal connections further aid in equalizing weight load distribution.

Referring to FIG. 1, each of the side frames includes a pair of longitudinal beams 66 and 68 welded together and suitably connected by uprights 69. Each side frame carries bearings such as self-aligning bearings 70 and 71 for journaling shaft 74 attached to rubber tired wheel 22. Similar bearings, including bearing 72, are provided for the front drive wheel 28 for journaling its drive shaft 76. A support bracket 78 extends outwardly from the side frame 18 to support bearing 70 adjacent wheel 22 as shown in FIG. 3. A similar arrangement is provided for the front drive wheel 28.

The side frames 18 and 20 are rigidly connected to each axle 90 of vehicle 10. FIGS. 2 and 3 show one means of connection at the rear axle and the rigid connection is accomplished by extensions 80 and 82 extending inwardly from the side frame 20 and carrying flexible straps 84 and 86 which surround axle housing 90 and are secured to the extensions 80 and 82 by bolts 88. With each side frame rigidly connected to each axle housing, upward forces applied to endless tracks 30 by uneven terrain will be applied to the axle 90, similar to the forces should a rubber tired wheel mounted on the axle encounter rough roads. Accordingly, vehicle springs 92 will suitably accommodate the load. The rigid connection also assures that no slack will occur in the drive connection 35.

This drive connection 35 includes a drive chain 94 trained around a sprocket 96 fixed to the vehicle drive axle and a lower sprocket 98 fixed to the drive shaft 74, see FIGS. 1 and 3. A similar connection is made for the front and rear wheels under each of the endless tracks 30 to each side of the front and rear axles of the vehicle 10.

The intermediate rubber tired wheels 24 and 26 are not driven and function as idler wheels. These wheels are mounted on idler shafts 100 and 102, FIGS. 1 and 2, and each shaft is journaled by a pair of bearings, such as bearings 106 and 108, similarly to the journaling of drive shafts 74 and 76, only the journals 106 and 108 are carried by a box-shaped sub-frame 110 rather than by the main side frame 20. The sub-frame 110 is pivotally connected to the side frame 20 by pivotal connection 112. With this arrangement, as uneven ground forces wheel 24 upwardly, frame 110 will pivot about connection 112 and wheel 26 will move downwardly to equalize the weight and load. In other words, movement of one of the intermediate idler wheels 24 and 26 in one direction causes an opposite movement of the other idler wheel for load equalization purposes.

In addition to the conventional structure of vehicle 10 which includes vehicle brakes (not shown), additional braking may be obtained by mounting brake drums 114 on the inner end of the drive shaft, such as shaft 74, see FIG. 3. The brake drums 114 are rigidly supported from the side frame 20 by a pair of extensions 115 and a strap 117 extending behind the brake drum 114.

The endless track 30 includes a pair of rubber belts 116, 118 spaced from one another and connected across their spacing by metal cleats 120 attached to each of the belts at suitable intervals. The individual belts themselves are connected end to end to form an endless track. The metal cleats 120 may be channel shaped and connected to the belts by bolts. Bent brackets 122 are welded to the inside of the metal cross-pieces 120 and are shaped to engage the sides of the tires, as shown in FIG. 3 and in FIG. 2. The track 30 is assembled on the wheels 22, 24, 26 and 28; the pneumatic rubber tires on the wheels are deflated and after assembly the tires are then inflated. Tightness or looseness of the track can be adjusted by the air pressure in the tires of the drive wheels.

Operation and steering of vehicle 10 with the track laying attachment is based on braking of one or the other of the endless tracks similar to that of steering most track laying vehicles. The front wheels of the vehicle 10 are locked in a straight position and the steering wheel is disengaged. The regular brake cylinder of the vehicle is connected to only one side and a second brake cylinder is installed and attached to the wheels on the other side. The braking connections for the vehicle brakes on one side are also connected to the extra brakes 114 on the same side. Steering of the vehicle is accomplished by applying the brakes on the side toward which it is desired to turn.

To convert the vehicle 10 from the track laying vehicle shown, all that is required to do is unbolt the frames and install the regular vehicle wheels in place of the sprockets 96, and reconnect the braking system and unlock the steering wheel. This operation can be accomplished by one mechanic in about 2 or 3 hours.

While the invention has been particularly shown and described with reference to a preferred embodiment thereof, it will be understood by those skilled in the art that various changes in form and details may be made therein without departing from the spirit and scope of the invention.

What is claimed is:

1. A track laying attachment for an automotive vehicle of the type comprised of a body portion having front, rear and side portions, front and rear drive axle housings having drive axles therein extending transversely across said body portion and spring means connecting said axles to said body portion comprising:
    (a) a substantially rectangular attachment frame having front and rear frame members adapted to be rigidly secured to the front and rear portions, respectively, of said body portion and each having a length adapted to extend from one side of said body to the other side of said body,
    (b) a pair of side frame members pivotally mounted on said rear frame member at opposite ends of said rear frame member and adapted to extend forwardly along the sides of said body portion,
    (c) lost motion connecting means between the forward end of said side frame members and said front frame member comprising vertically extending, elongated slot means formed at the front end of each of said side frame members and headed pin means secured to said front frame member adjacent opposite ends thereof and extending through said slot means.
    (d) an equalizer bar pivoted at the midpoint thereof to the midpoint of said front frame member and having end portions pivotally secured to the front ends of said side frame members,
    (e) means on said side frame members forwardly of the pivotal connection between said side frame members and said rear frame member adapted to rigidly secure each side frame member to opposite ends of said front and rear axle housings,
    (f) a plurality of wheels rotatably journaled in each side frame about axes which are offset below the axes of said front and rear drive axles when said attachment frame is mounted on said vehicle body portion,
    (g) endless track means for each side frame trained around said wheels, and
    (h) drive connection means connected to at least some of said wheels and adapted to be connected to at least one of said axles to impart a drive from at least one of said drive axles to said wheels and track means.

2. A track laying attachment as defined in claim 1 wherein the wheels are pneumatic rubber tired automobile wheels.

3. A track laying attachment as defined in claim 2 wherein the drive connection means to at least some of the rubber tired wheels comprises a chain trained over a sprocket adapted to be attached to one of the drive axles of the vehicle and another sprocket attached to a shaft carrying a rubber tired wheel.

4. A track laying attachment as defined in claim 2 wherein the endless track means for each side frame includes a pair of spaced nonmetallic belts connected across their spacing by metallic cleats which contact the rubber tired wheels to constitute a drive connection to the belt.

5. A track laying attachment as defined in claim 4 wherein the metallic cleats include brackets for engagement with the sides of the rubber tired wheels.

6. A track laying attachment as defined in claim 1 wherein the wheels of each side frame include front and rear driving wheels each having a chain drive means adapted for connection to the front and rear axles of said vehicle respectively.

7. A track laying attachment as defined in claim 6 further comprising two idler wheels for each side frame intermediate the front and rear driving wheels, and a mount for the idler wheels pivotally connected to the side frame.

8. In a vehicle of the type comprised of a body portion having front, rear and side portions, front and rear drive axle housings having drive axles therein extending transversely of said body portion and spring means connecting said axles to said body portion, the improvement comprising:
- (a) substantially rectangular attachment frame means having front and rear frame members rigidly secured to said front and rear portions, respectively, of said body portion and each having a length adapted to extend from one side of said body to the other side of said body,
- (b) a pair of side frame members pivotally mounted on said rear frame member at opposite ends of said rear frame member and extending forwardly along the sides of said body portion,
- (c) lost motion connecting means connecting the forward end of said side frame members to said front frame member,
- (d) means rigidly securing said side frame members to opposite ends of said front and rear axle housings,
- (e) a plurality of wheels rotatably journaled in each side frame about axes which are offset below the axes of said front and rear drive axles,
- (f) endless track means for each side frame trained around said wheels journaled in the respective side frame, and
- (g) drive connection means between at least one of said front and rear axles and at least one of said wheels on each side of said vehicle body to drive said wheels and said track means entrained thereon.

References Cited

UNITED STATES PATENTS

| | | | |
|---|---|---|---|
| 1,746,001 | 2/1930 | Leake | 180—9.54 |
| 2,749,189 | 6/1956 | France | 180—5 X |
| 2,852,317 | 9/1958 | Riemerschmid | 180—9.6 |
| 2,891,821 | 6/1959 | Mayr | 305—32 X |
| 2,992,862 | 7/1961 | Fredricks | 180—6.7 |
| 3,163,249 | 12/1964 | Ledohowski | 180—9.2 |
| 3,183,987 | 5/1965 | Trombley | 305—35 X |

FOREIGN PATENTS

| | | |
|---|---|---|
| 474,958 | 4/1929 | Germany. |
| 925,032 | 5/1963 | Great Britain. |

RICHARD J. JOHNSON, *Primary Examiner.*